UNITED STATES PATENT OFFICE.

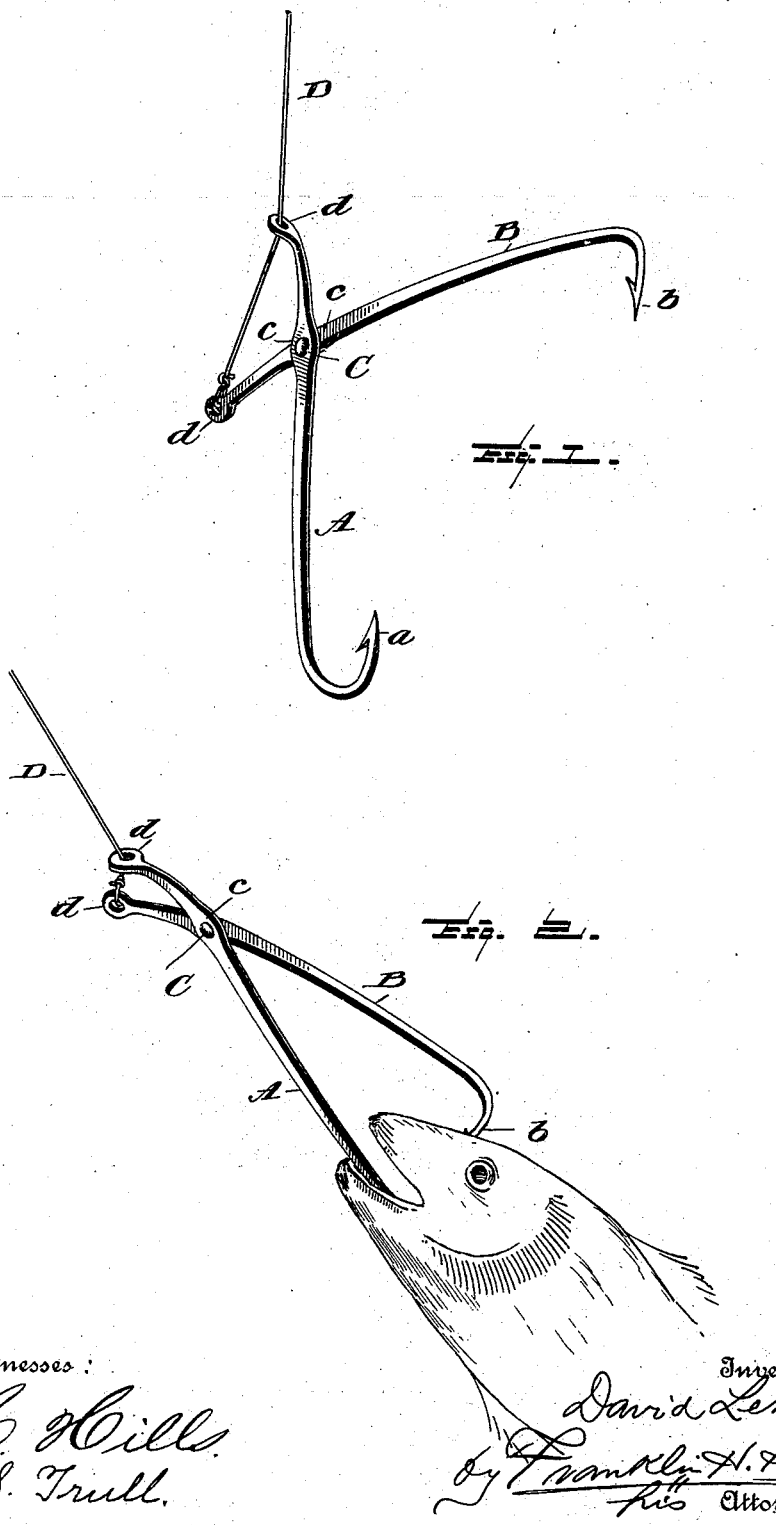

DAVID LEHMANN, OF HALSTEAD, KANSAS.

FISH-HOOK.

SPECIFICATION forming part of Letters Patent No. 503,864, dated August 22, 1893.

Application filed May 6, 1893. Serial No. 473,283. (No model.)

*To all whom it may concern:*

Be it known that I, DAVID LEHMANN, a citizen of the United States, residing at Halstead, in the county of Harvey and State of Kansas, have invented certain new and useful Improvements in Fish-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fish-hooks of that class in which two or more hooks are provided, one to serve for impaling the fish while he is biting or nibbling at the bait, and it has for its objects among others to provide a simple and cheap device of this character in which all springs or spring clamps are dispensed with, and the hooks so connected and operated as to be positive in their action, and besides there are no projections as when a spring clasp is employed, to catch into the grass or weeds. I provide two hooks the shanks of which are crossed and pivotally connected together at their point of crossing, the shanks being extended beyond their pivots and provided with eyes, in one of which the line is fastened and loosely passed through the other, one of the hooks being an ordinary barbed hook for holding the bait and catching the fish and the other an impaling hook which is adapted to be forced into the fish, the latter hook being arranged substantially at a right angle to the other.

Other objects and advantages of the invention will hereinafter appear and the novel features thereof will be specifically defined by the appended claims.

The invention in the present instance resides in the peculiar construction of the hook, and the combination, arrangement and adaptation of the parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 1 is a perspective view of my improved hook, open. Fig. 2 is a side elevation with the impaling hook engaged in a fish.

Like letters of reference indicate like parts in both of the views.

Referring now to the details of the drawings by letter, A designates the hook with the barbed point $a$ which may be turned up more or less as may be desired, and B is the impaling hook which has a barbed point $b$ which is arranged however at a right angle to its shank and so as to extend substantially at a right angle to the point of the hook A. The shanks of the two hooks are flattened at their points of intersection as shown at $c$ and at these points the two are pivotally connected by the pivot C, the connection being such as to permit of free and easy movement of the hooks one independent of the other. The shanks are extended beyond their pivots and each formed with an eye $d$, the eye on the one shank being at a right angle to that of the other.

D is the line; it is passed loosely through the eye of the hook A and is made fast in the eye of the hook B as shown.

In practice, the hooks are spread apart before being lowered into the water so that they assume the position in which they are shown in Fig. 1. When the fisherman feels the fish nibbling at the bait which is placed upon the hook A he pulls upon the line which movement throws the impaling hook B with considerable force into the position in which it is shown in Fig. 2 and forcing its barb into the fish as shown in said Fig. 2.

It will be observed that by my construction and arrangement of parts no springs or spring clamps are necessary, the operation is positive and reliable, there are no projections to catch into the grass or weeds, and by dispensing with such contrivances as springs and clasps the cost of manufacture is materially lessened and the liability of becoming injured or inoperative is correspondingly decreased. The arranging of the eyes of the shanks at right angles to each other is important as by this means the pull on the cord is direct and there is no liability of its being cut or worn by use. The pull is directly upon the impaling hook so that the other will not be moved to any great extent to frighten the fish at the bait.

What I claim as new is—

1. A fish-hook comprising two hooks having their shanks crossed and pivotally connected together and lying flat against each other, each shank being provided with an eye the one arranged at right angles to the other, substantially as specified.

2. The combination with a fish-hook consisting of two hooks having their shanks crossed and pivoted together and each shank formed into an eye with the eyes at right angles to each other, of a cord passed loosely through one of said eyes and made fast to the other the barbs of the two being substantially at right angles to each other, and the two parts at their pivot lying flat against each other, substantially as shown and described.

In testimony whereof I affix my signature in presence of witnesses.

DAVID LEHMANN.

Witnesses:
JOHN H. MCNAIR,
GUS. A. HEGE,
JOHN H. LINN.